(12) United States Patent
Holsztynska et al.

(10) Patent No.: US 8,296,124 B1
(45) Date of Patent: Oct. 23, 2012

(54) METHOD AND APPARATUS FOR DETECTING INCORRECTLY TRANSLATED TEXT IN A DOCUMENT

(75) Inventors: Joanna Holsztynska, Sunnyvale, CA (US); Katsuhiko Momoi, Mountain View, CA (US); Erik Beans, Redwood City, CA (US); Daniel Khuong, San Jose, CA (US); Hayden Shaw, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 914 days.

(21) Appl. No.: 12/276,049

(22) Filed: Nov. 21, 2008

(51) Int. Cl.
*G06F 17/28* (2006.01)
(52) U.S. Cl. .............. 704/2; 704/4; 704/5; 704/7; 704/9
(58) Field of Classification Search .................. 704/2, 4, 704/5, 9, 7
See application file for complete search history.

(56) References Cited

U.S. PATENT DOCUMENTS

| | | | |
|---|---|---|---|
| 6,351,726 B1* | 2/2002 | Wong | 704/3 |
| 2002/0165885 A1* | 11/2002 | Kumhyr et al. | 707/536 |
| 2006/0025988 A1* | 2/2006 | Xu et al. | 704/8 |
| 2008/0195377 A1* | 8/2008 | Kato et al. | 704/8 |
| 2008/0201703 A1* | 8/2008 | Lerum et al. | 717/172 |
| 2009/0063128 A1* | 3/2009 | Seo et al. | 704/2 |
| 2009/0112787 A1* | 4/2009 | Ginzberg | 706/47 |

* cited by examiner

*Primary Examiner* — Qi Han
(74) *Attorney, Agent, or Firm* — Sterne, Kessler, Goldstein & Fox P.L.L.C.

(57) ABSTRACT

A system that detects incorrectly translated text in a document. During operation, the system determines a target language for the document. The system then identifies one or more terms in the document that are invalid terms for the language. Next, the system analyzes correlations between these invalid terms, and, based on these correlations, determines whether one or more of the invalid terms comprise incorrectly translated text.

20 Claims, 4 Drawing Sheets

METHOD AND APPARATUS FOR DETECTING INCORRECTLY TRANSLATED TEXT IN A DOCUMENT

BACKGROUND

1. Field

The described embodiments relate to techniques for detecting incorrectly translated and/or untranslated text in a document.

2. Related Art

Easy access to computers and plentiful network bandwidth have made it very easy to distribute computer-based applications globally. In order to distribute an application globally, the application may need to be translated into multiple languages to accommodate different locales. This translation process often involves dividing the text associated with the application into specific units, translating these units individually into one or more languages, and then recombining the translated units to form a translated application. Unfortunately, this translation process involves many steps, each of which can potentially introduce errors into the final result.

Quality assurance engineers typically manually verify that a final translated application seen by customers has been translated properly for all of the supported languages. However, manually reading and testing each page of an application to find translation errors becomes unscalable as the number of applications and languages grows. For instance, translating an application into forty different languages may require a significant amount of time, with each application page and/or change requiring forty different tests. Furthermore, obtaining the personnel to verify the correctness of the translated end results and correctly identify errors in forty languages may be difficult in practice.

SUMMARY

This disclosure presents a system that detects incorrectly translated text in a document. During operation, the system determines a target language for the document. The system then identifies one or more terms in the document that are invalid terms for the language. Next, the system analyzes correlations between these invalid terms, and, based on these correlations, determines whether one or more of the invalid terms comprise incorrectly translated text. Note that incorrectly translated text can include, but is not limited to, one or more of the following: untranslated text from a base language that is included in a document with a different target language (e.g., due to a process error); text in a document that is in a different language than the target language for the document; partially garbled text; unidentifiable text; and/or poorly translated text (e.g., a series of misspelled words in the document that closely correspond to words found in a dictionary for the target language).

In some embodiments, the system identifies the set of invalid terms using a spell-checker for the target language and/or one or more language identification techniques.

In some embodiments, the system can receive user input that specifies the target language associated with text in the document and/or can identify the target language associated with text in the document using an automated language-identification technique.

In some embodiments, the system receives a list of exception terms that should not be translated. During operation, the system ignores any invalid terms that are found in the list while analyzing the invalid terms.

In some embodiments, the system detects correlations between contiguous invalid terms in the document. For instance, in some embodiments the system may identify three or more contiguous invalid terms in the text as a block of incorrectly translated text.

In some embodiments, the system presents blocks of incorrectly translated text to a user for confirmation of whether or not the blocks are incorrectly translated.

In some embodiments, the system detects blocks of incorrectly translated text that were erroneously not translated during an automated translation process.

In some embodiments, the system determines a base language from which the document was translated, and uses a spell-checker for that base language to confirm that the block of incorrectly translated text is in the base language.

In some embodiments, the system uses a web-crawler to determine one or more documents associated with an application. The system then identifies any incorrectly translated text in these documents. Note that such documents may include static documents as well as documents that are dynamically created by the application at run-time.

Figure 1:
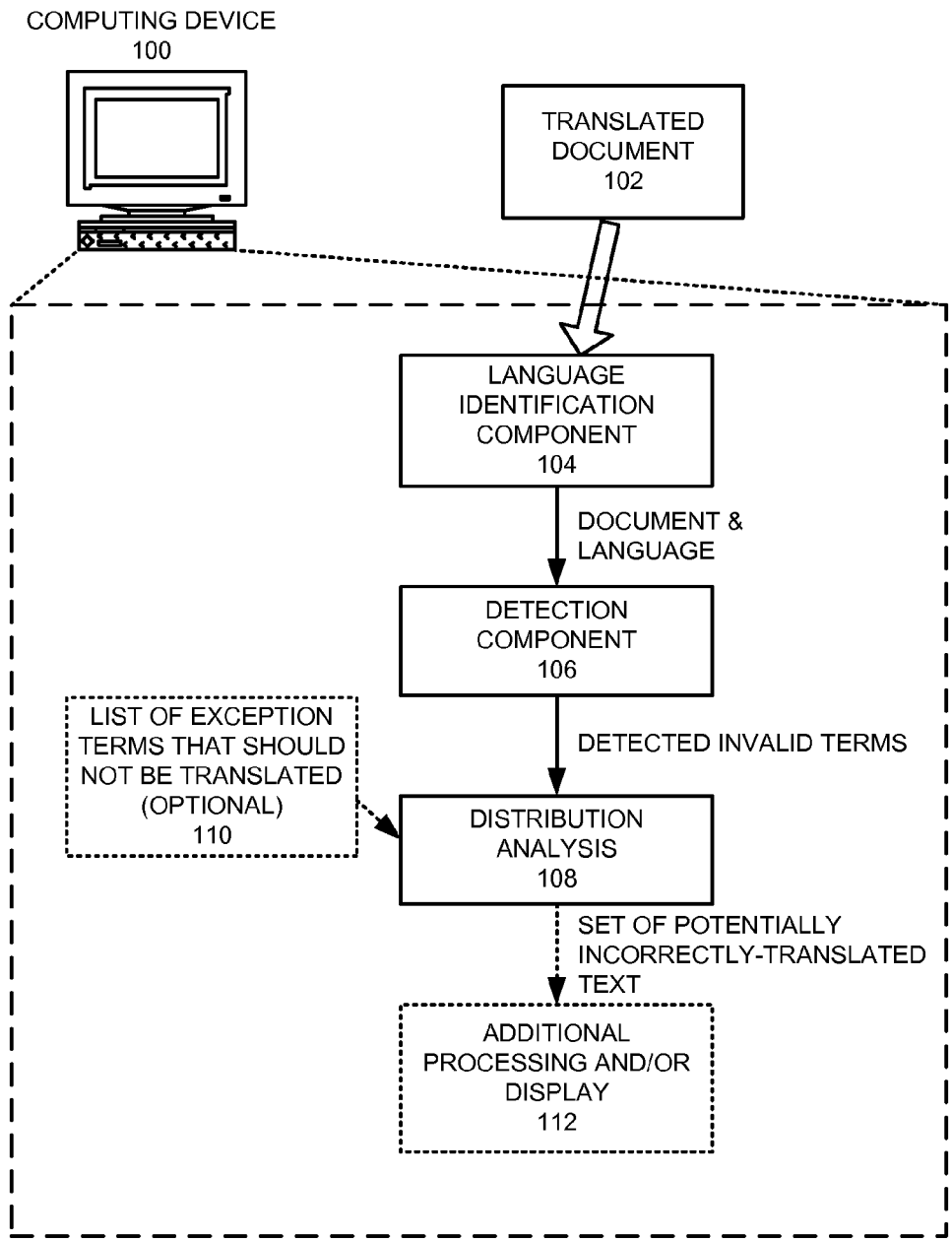
FIG. 1 illustrates the process of detecting incorrectly translated text in a document in accordance with an embodiment.

Table 1 illustrates an exemplary analysis output for a set of translated documents in accordance with an embodiment.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the various embodiments are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

1. Translation of Application Text

Translating the text associated with a software application into multiple languages can be a time-consuming and challenging process. For example, the text used in a given software application is typically divided into a set of "text segments," each of which is associated with a language-independent identifier (ID). The ID associated with a given text segment is constant across all of the languages supported by the application. Moreover, each text segment in the application includes a translated text segment for each language supported by the application. During operation, the application determines the ID for the string of text to be displayed, and then, based on the current language locale, determines and displays the translated text that is associated with the ID. Note that during application development, application text is typically translated at the granularity of such IDs. For instance, application developers using English as a base language may define a set of IDs and associated English text strings for the set of messages in an application, after which a translation team translates the English text associated with each ID into a similar message in every additional supported language. Hence, translation may occur at a per-message granularity. One consequence of such a translation process is that translation errors may involve blocks of untranslated text.

Quality assurance engineers, localization specialists, software engineers, product managers, and other project development personnel (hereafter referred to collectively as "test engineers") are often involved throughout the development process of an application to ensure that application text is correctly translated for all of the supported languages. However, while translations can be checked prior to release of the application, the final version of the application will still need to be checked after release, because translation errors may be introduced at any stage of the application development process. For instance, even if the text for an application is correctly translated into multiple languages by a translation team, errors in coding, building, and/or distributing a release of the application may introduce untranslated and/or mis-translated (e.g., in an unexpected language) text into the application. For example, a networked application that receives pages from multiple servers may erroneously receive incorrectly translated text from one of the multiple servers. Hence, confirming that text in an application is correctly translated is often not possible until after the application has actually been distributed and released. Furthermore, having test engineers manually verify application text after releasing the application can take considerable time and effort, and is prone to human error. For instance, test engineers may accidentally miss some published pages while systematically reviewing the multiple (different-language) versions of the application text.

Existing techniques that are sometimes associated with translation efforts cannot easily identify incorrectly translated text (e.g., text that is either untranslated or in an unknown rogue language) within a body of translated text. For instance, language identification techniques often require large strings of contiguous text in order to accurately identify a language (e.g., such techniques are not accurate at identifying the language of small blocks of text with high confidence, and hence typically also cannot identify the language of single words with high confidence). Alternatively, spell-checking techniques operate at a per-word granularity to detect misspelled words in the text (for a specific language), but do not identify correlations between multiple misspelled terms in the text. For instance, spell-checking techniques cannot determine whether a misspelled word is a valid word from a different language, and do not perform semantic analysis upon groups of misspelled terms. Note that even a spell-checker with a "perfect" dictionary for a given language might not be able to find erroneous words that are spelled the same way in a different language, but have different meaning (e.g., the word "come" is a valid word with different meanings in Italian and English). Furthermore, creating such a perfect dictionary requires an incremental, iterative process which requires substantial language expertise in every supported language.

2. Detecting Incorrectly Translated Text

One embodiment provides a system that analyzes translated text to identify incorrectly translated text. Test engineers can use this system to identify and fix errors, rather than performing the tedious, time-consuming and error-prone work of manually finding translation errors. In some embodiments, the system includes: a language identification component that identifies the target language for a set of translated text; a detection component that identifies terms in the translated text that are likely to be invalid; and an analysis component that analyzes the output of the detection component to determine any incorrectly translated text in the translated text.

2.1 Identifying a Target Language for a Document

In some embodiments, the system can use one or more identification techniques to determine the intended target language for a received text document. These identification techniques may involve: receiving input from test engineers checking the correctness of the application; analyzing the nature and/or structure of the application; and/or analyzing the content of the received text document. For instance, such identification techniques may include: 1) receiving a user-supplied hint for the expected target language associated with a given document; 2) determining the expected target language for a given document based on application information associated with the document (such as a language hint in the Uniform Resource Locator (URL) string for the document); and/or 3) using a language identification component that performs text analysis on the contents of the document to identify the primary language in the document.

Note that the system may use multiple identification techniques to ensure that the target language of a received text document is identified correctly. For instance, while standard language-identification techniques can (given sufficient text is available) identify a language for a translated document, if the entire document, or a substantial portion of the document, is delivered in a non-target (e.g., erroneous) language, such techniques might return a language different from the actual target language. However, such automated language-identification techniques may still be useful to validate (or invalidate) user-supplied hints for target languages, or when no other information is available. Alternatively, a target language identified by a user hint may be compared with language-related information found in a URL for the received text document (e.g., the "fr" in the URL "http:// . . . /intl/fr" may be construed as an indication that the intended language for the document should be French). In some embodiments, the system use one or more of such identification techniques based on the availability of hints and/or other information.

2.2 Identifying Invalid Terms for a Document

After using the language identification component to identify the target language associated with a textual document, the system can then use a variety of techniques that analyze the text of the document to identify terms in the text that are likely to be invalid. For instance, the system may attempt to identify invalid terms in the document using a spell-checker and/or one or more language identification techniques.

In some embodiments, the system incorporates a spell-checker that: (1) analyzes the words in the document using a dictionary for the identified language; and (2) returns a set of misspelled words for the given language and document. For example, if the system determines that a translated document primarily includes French text, it can instruct the spell-checker to spell-check the document using a dictionary of French terms. The spell-checker then outputs a list of misspelled terms for the document, along with information about their exact location in the document and suggested corrections (if they are available).

Alternatively (or in conjunction to the above-described spell-checking techniques), the system may also attempt to identify invalid terms in the document using one or more language identification techniques. Note that this second use of language identification techniques may differ in type and scope from the above-described set of language identification techniques that determine an overall intended target language for the document. For instance, when identifying invalid terms in the document, the system may iteratively parse and/or process different-sized text segments in the document using a language identification technique (e.g., the system may apply language identification techniques sequentially to each word or sentence in the document). Note that language identification techniques may not provide a 100% guarantee that a text segment is a given language, but may instead provide a confidence score for a most likely language for the text segment or a table with probabilistic scores for a set of languages. In such cases, the system may determine that a word or text segment with a low probability for the expected (target) language (previously identified for the document) is likely to be invalid.

Note that the number and types of techniques used to identify invalid terms in a document may vary, and that the system may choose one or more techniques to identify invalid terms based on the size of the text being checked, the target language, and other factors. For instance, the described techniques may be applied to blocks of translated text that range from a single word to thousands of pages (or larger).

2.3 Analyzing Invalid Terms to Find Incorrectly Translated Text

After detecting a set of terms in the document that are likely to be invalid, the system analyzes the type and location of these invalid terms in the document to identify correlated clusters of invalid terms. For example, after using a spell-checker to identify a set of misspelled words in a document, the system can send the spell-checker's output to the analysis component, which then determines the distribution of invalid terms in the document and uses this distribution to identify correlated blocks of incorrectly translated text.

In some embodiments, the system identifies contiguous clusters of terms that have been marked as invalid by a spell-checker and/or a language identification technique as potentially incorrectly translated strings. During this process, the system may use a parameter that specifies the minimum size of such clusters. For instance, the system may be configured to flag any strings that include three or more consecutive misspelled words as potentially incorrectly translated strings. By analyzing clusters of invalid terms (instead of individual terms), the system can reduce false positives, check for false negatives, and generally improve accuracy in finding incorrectly-translated text. Such techniques are often well-suited for finding errors in translation systems that are based on the translation of phrases, where finding several invalid terms in a row is likely to indicate a translation error. However, in some scenarios identifying and analyzing clusters of invalid terms may be unnecessary. For instance, if a "perfect" dictionary (that includes custom terms and excluded terms) or language identification technique were available, additional analysis might be unnecessary because only truly wrong terms could ever be flagged.

Note that the accuracy of such analysis depends heavily on the quality of the analysis inputs (e.g., on the set of invalid terms that are output by the spell-checker and/or the language identification techniques and received by the analysis component). For instance, if the spell-checking component is highly reliable and/or of high quality and the misspelled words are clustered in specific contiguous locations of the text, the misspelled words are likely to be incorrectly translated sentences. Alternatively, for the same high-quality spell-checker, if the misspelled words are widely and sparsely distributed over different areas of the document text, they may instead be words that were not included in the dictionary for the specific target language (e.g., product names, or stray terms that are simply not included in the given dictionary). If a spell-checker is of poor quality, clusters of errors may not be unusual, and hence may be less likely to be related to incorrectly translated sentences. Note that spell-checking techniques are not perfect, and that results may vary depending on the language and/or dictionary, so additional checks may be needed for languages where the spell-checker and/or associated dictionary are of low quality and are prone to returning a high percentage of misspelled words.

In some embodiments, the system can be configured to receive a list of exception terms that should not be translated (and hence should not be considered invalid) in the application text. For instance, the analysis component may take as an input a list of terms such as product names or other common language-independent and/or technical terms (e.g., "Internet") that are often not translated in the documentation for an application. Note that in some situations lists of exception terms may be language-specific, and the list of exceptions can be customized on a per-language basis. For example some target locales may prefer that a set of special terms not be translated, while other locales may strongly prefer that no foreign terms are present in the translated text. During the analysis process, the system compares the list of invalid terms returned by the spell-checker and/or a language identification technique with this list of exception terms, and ignores (or provides special handling for) any invalid terms that show up in the list of exception terms during the analysis.

In some embodiments, the system performs additional tests upon identified blocks of invalid terms that might be incorrectly translated strings. For instance, the system may use the language identification component in an additional attempt to identify the specific language associated with each block. If sufficient text is available for the language identification component to determine that one or more blocks contain text in a language different from the target language, this technique can be used to confirm that the identified blocks are indeed incorrectly translated. Alternatively, if the base language for the translated text is known (e.g., the application was originally developed in English, and then translated to other languages), the system can invoke a spell-checker with a dictionary for the base language on an identified block of misspelled terms to determine whether the identified block is likely to be in the base language. If the base language cannot be determined, the system may perform a set of checks in an attempt to identify the language of the misspelled blocks. For instance, if the misspelled text is purely ASCII text, the base language is likely to be English. In another alternative, the system may be configured to invoke the spell-checker multiple times, with each invocation using a dictionary for a different language in the set of possible languages. The system can then determine a likely language for the potentially-incorrectly-translated block by comparing the number of errors returned for each run of the spell-checker (where a language and dictionary that resulted in no errors would likely indicate a correctly-identified language for the block). Because incorrectly translated blocks in application text are often more likely to default to a standard base language (e.g., the language that was used during application development), the system may only perform such a brute-force technique on a small set of commonly-used base languages. Performing additional operations that attempt to determine a language associated with a block of misspelled terms can help to determine whether the spelling errors are due to blocks of incorrectly translated text or limitations of a target language dictionary.

In some embodiments, the described techniques can be used to find text in a document that is in a different language than the surrounding text, even when the target language is not known. For instance, even without being given a target language, the described system can: (1) use language recognition techniques upon the document to detect a language that is likely to be the primary language for the majority of the text in the document; (2) use the described spell-checking and analysis techniques to determine whether any blocks of text exist in the document that are likely to be in a language different from the detected primary language. Depending upon the resolution of the language recognition techniques (e.g., the number of contiguous words needed to determine the type of a given language with a desired certainty), such techniques may also be used for a range of other actions (e.g., to determine and visually highlight different language sections in a document).

2.4 Exemplary Processes for Finding Incorrectly Translated Text

FIG. 1 illustrates an exemplary process for detecting incorrectly translated text in a document for one embodiment of the described system. During operation, computing device 100 receives and/or opens a set of translated text, for instance in the form of a translated document 102. This translated document 102 is fed into language identification component 104, which identifies a target language for the translated document 102. The identity of this language is then passed to detection component 106 (along with translated document 102), which identifies terms in the document that are likely to be invalid for the target language. Detection component 106 may incorporate language identification techniques and/or a spell-checker which uses a dictionary for the identified language to spell-check translated document 102. Detection component 106 then outputs a set of detected invalid terms, which are then passed to a distribution-analysis module 108. Next, distribution-analysis module 108 analyzes the set of invalid terms and the document to identify potentially incorrectly translated strings. Note that distribution-analysis module 108 may optionally also receive a list of exception terms that should not be translated 110, and hence should not be considered as being invalid for translated document 102. Distribution-analysis module 108 then checks the set of invalid terms received from detection component 106, and ignores any invalid terms present in list of terms 110. Finally, distribution-analysis module 108 outputs a set of potentially incorrectly translated text blocks. Note that the system may display and/or perform additional processing 112 upon this output.

Figure 2:
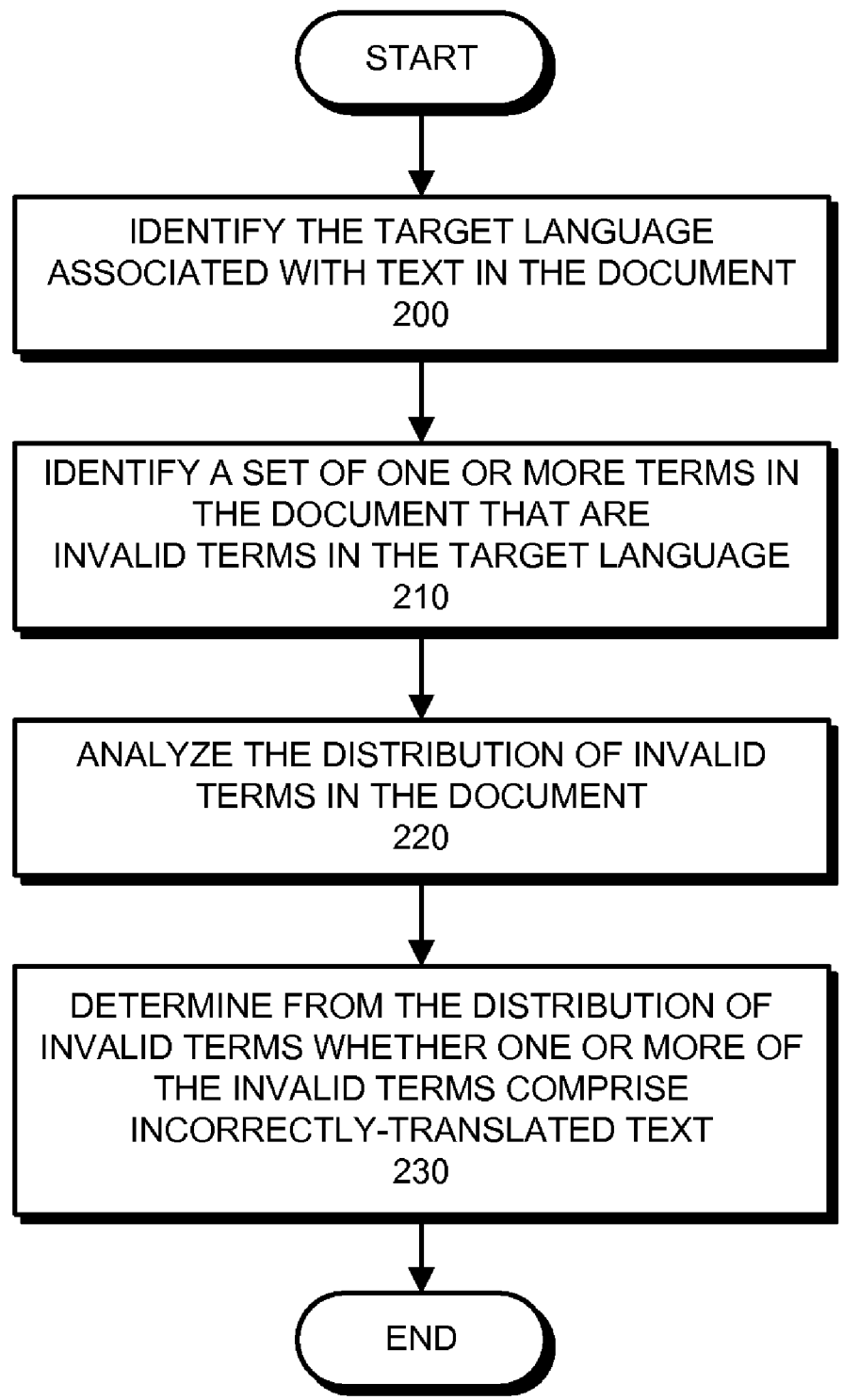
FIG. 2 presents a flow chart illustrating the process of detecting incorrectly translated text in a document in accordance with an embodiment.

FIG. 2 presents a flow chart illustrating the process of detecting incorrectly translated text in a document. During operation, the system identifies the target language associated with the text in the document (operation 200), after which it identifies a set of one or more terms in the document that are invalid terms in the identified language (operation 210). The system then analyzes the set of invalid terms to determine the distribution of the invalid terms in the document (operation 220). The system can determine from the distribution of invalid terms whether one or more of the invalid terms comprise incorrectly translated text (operation 230). For instance, the system may determine from the distribution that many invalid terms are clustered together, and are hence likely to comprise incorrectly translated text.

2.5 Exemplary Inputs

In some embodiments, the system receives a set of parameters associated with a translated document. For instance, the input received by the system may include:
  a file that contains a set of translated text;
  information about the type and format of the text in the file (e.g., whether the file format is plaintext, HTML, a portable document format (PDF), or some other digital format);
  optionally, the target language for the translated text in the file;
  information specifying a set of spell-checking tools and/or dictionaries to be used for the file; and
  one or more support files (e.g., a list of exception terms that should not be considered as misspelled).

Note that some embodiments of the system may include customized dictionaries of valid terms that are not typically found in a dictionary. As mentioned above, the system may support analyzing multiple formats of received text, including plaintext, static and/or dynamically-generated HTML, and PDF. For some of these input formats, such as HTML, such customized dictionaries may include customized terms that ensure that the spell-checker and/or language identification techniques do not flag input-format-specific terms. Alternatively, such customized dictionaries may also include the previously-mentioned exception terms described above (e.g., product names). In this case, such customized dictionaries might be input to the spell-checker and/or language identification techniques as an alternative to providing a set of exceptions when analyzing the distribution of invalid terms.

In some embodiments, the described system is used in conjunction with a web-crawler to automate the process of checking the application for translation errors. For instance, the web-crawler can be used to scan all of the linked text in a web-based application. During this scan, the web-crawler may automatically scan and check the text associated with all of the different languages supported by the web-based application. For instance, because the language files for many applications are often arranged in a very regular hierarchical structure, by language, the web-crawler may be able to automatically find and check all of the documents associated with these different languages.

In some embodiments, techniques for identifying untranslated text may be integrated directly into a crawling mechanism. For instance, some product development efforts may include test applications that use "smart-crawling" techniques that navigate the content and/or functionality of an application for testing purposes. Because such smart-crawling techniques may include the ability to access and check limited-access documents (e.g., application pages that require passwords), such integration can increase the percentage of the application text that is checked for untranslated text. Alternatively, some embodiments may use less-integrated crawling techniques that primarily collect text data, where the collected data is later fed into the described spell-checking and analysis components. Note that a range of crawling techniques may be used to check an application's pages, both during development as well as after the application is released, to minimize the set of errors that may be seen by application end-users.

2.6 Exemplary Outputs

In some embodiments, the described system can use a range of formats to output any incorrectly translated text found while analyzing the distribution of the set of invalid terms in a translated document. For instance, the system may: output a text file or web page containing such results; automatically log a set of bug reports; and/or include a user interface that pinpoints to a user the portions of the document in question and allows the user to visually verify mistranslated blocks of text. Alternatively, the output may be fed into a tool that identifies the given text ID(s) (in the context of the application) for the text in question.

In some embodiments, the system may output a list of errors that includes: the name of the input document; the primary language determined for the input document; identifying information for incorrectly translated text strings that are not in this language (e.g., a starting and ending location for each text string that is incorrectly translated), and; information associated with each incorrectly translated text string that was identified (e.g., a weight or computed probability that indicates the strength of the system's determination that the text string is incorrectly translated text). In some embodiments, the system may compute and output additional statistical information while analyzing the document. For instance, the system may determine and output: a list of the languages detected in the document; a listing of locations in the document for each language found; the percentage of text associated with each language identified in the document; the percentage of invalid words detected for the primary language; the number of exception terms detected in the document; and the percentage of the terms that are unknown for the primary language (e.g., the number of invalid words remaining minus the count of the exception terms that were found in the document).

In some embodiments, the system may graphically highlight incorrectly translated text for human review. Because potential errors are not necessarily errors (e.g., a string of spelling mistakes in the translated text may be flagged as an incorrectly translated text string), in some cases text that has been identified by the system as being incorrectly translated may still need to be investigated and/or confirmed by a user. Note that some embodiments that use the previously-described technique of a second spell-checking pass that uses foreign language dictionaries to confirm the presence of rogue text may reduce the likelihood of errors in the results.

Table 1 illustrates an exemplary analysis output for a set of translated documents. The first line of the output identifies the target language that was identified for the translated documents (where "ar" is the two-letter identification code for the Arabian language). The following lines identify: a list of files for which no untranslated content has been found (e.g., the bulleted list of files named under "Files-OK"); a list of files which contain detected untranslated text strings, along with the specific untranslated text strings that were found in each file (e.g., the bulleted list of filenames and identified strings listed under "Files-NOT OK"); a list of files for which language information was not detected (e.g., the file "/chat.html" listed under "Files-LANGUAGE_NOT_DETECTED"); a list of files that were not encoded using the UTF-8 character set ("Files-FATAL_NOT_UTF", which includes no files in this example), and; a list of files where the language of the file contents did not match the expected target language ("Files-LANGUAGE_MISMATCH", which includes no files in this example). Note that the illustrated output includes some false warnings. For example, a product may include a drop-down list of languages that can be used to switch the language of the product's user interface. This list may include native language names and spellings, instead of terms in the target language for the document, and hence may be flagged as incorrectly-translated text. Such terms could be included in an exception list, so that such clusters of text are not identified by the analysis component (e.g., the foreign language names listed for "/whatsnew.html").

3. Computing Environment

In one embodiment, the described system can be incorporated into and/or accessed by a wide range of computing devices in a computing environment. For instance, the described language identification, spell-checking, language identification, and/or distribution analysis techniques may be implemented on or by a single computing device, or may be shared across multiple applications and/or computing devices.

Figure 3:
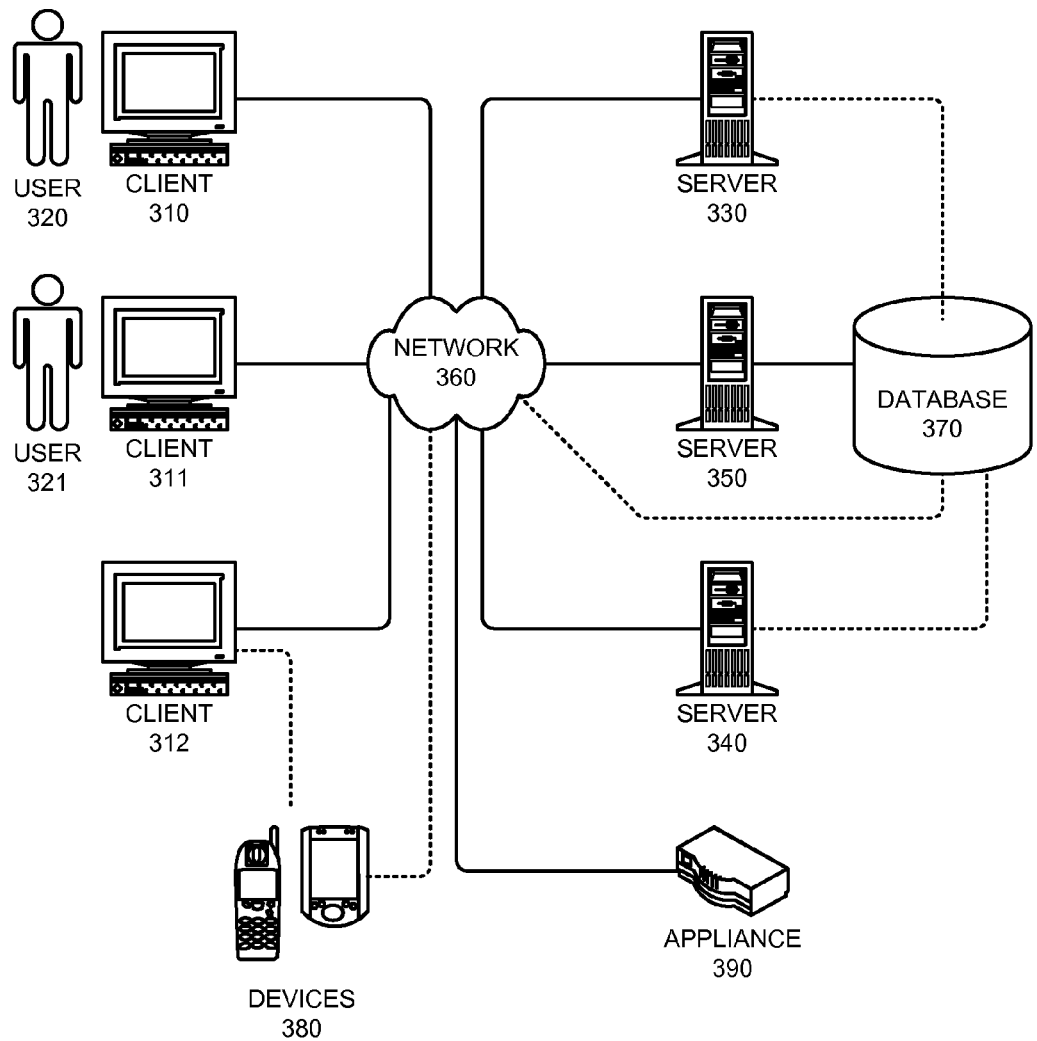
FIG. 3 illustrates a computing environment in accordance with an embodiment.

FIG. 3 illustrates a computing environment 300 in accordance with an embodiment of the system. Computing environment 300 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 3, computing environment 300 includes clients 310-312, users 320 and 321, servers 330-350, network 360, database 370, devices 380, and appliance 390.

TABLE 1

Language: ar
  Files-OK:
    /about.html
    /intro.html
    /learn_more.html
    /mobile.html
    /thankyou.html
  Files-NOT_OK:
    /more.html
      The Subpoena Defense Alliance
      The Electronic Communications Privacy Act
      Mail since well
    /whatsnew.html
      off the record
      with your friends instantly
      Hrvatski Italiano Íslenska Latviešu Lietuvių
      Português Română Slovenský Slovenščina Suomi
  Files-LANUAGE_NOT_DETECTED
    /chat.html
  Files-FATAL_NOT_UTF
  Files-LANGUAGE_MISMATCH Clients 310-312 can include any node on a network including computational capability and including a mechanism for communicating across the network. Additionally, clients 310-312 may comprise a tier in an n-tier application architecture, wherein clients 310-312 perform as servers (servicing requests from lower tiers or users), and wherein clients 310-312 perform as clients (forwarding the requests to a higher tier).

Similarly, servers 330-350 can generally include any node on a network including a mechanism for servicing requests from a client for computational and/or data storage resources. Servers 330-350 can participate in an advanced computing cluster, or can act as stand-alone servers. In one embodiment, server 340 is an online "hot spare" of server 350.

Users 320 and 321 can include: an individual; a group of individuals; an organization; a group of organizations; a computing system; a group of computing systems; or any other entity that can interact with computing environment 300.

Network 360 can include any type of wired or wireless communication channel capable of coupling together computing nodes. This includes, but is not limited to, a local area network, a wide area network, or a combination of networks. In one embodiment, network 360 includes the Internet. In some embodiments, network 360 includes phone and cellular phone networks.

Database 370 can include any type of system for storing data in non-volatile storage. This includes, but is not limited to, systems based upon magnetic, optical, or magneto-optical storage devices, as well as storage devices based on flash memory and/or battery-backed up memory. Note that database 370 can be coupled: to a server (such as server 350), to a client, or directly to a network. In some embodiments, database 370 is used to store information related to applications, languages, and/or translated documents. Alternatively, other entities in computing environment 300 may also store such data (e.g., servers 330-350).

Devices 380 can include any type of electronic device that can be coupled to a client, such as client 312. This includes, but is not limited to, cell phones, personal digital assistants (PDAs), smart-phones, personal music players (such as MP3 players), gaming systems, digital cameras, portable storage media, or any other device that can be coupled to the client. Note that in some embodiments, devices 380 can be coupled directly to network 360 and can function in the same manner as clients 310-312.

Appliance 390 can include any type of appliance that can be coupled to network 360. This includes, but is not limited to, routers, switches, load balancers, network accelerators, and specialty processors. Appliance 390 may act as a gateway, a proxy, or a translator between server 340 and network 360.

Note that different embodiments may use different system configurations, and are not limited to the system configuration illustrated in computing environment 300. In general, any device that is capable of communicating via network 360 may incorporate elements of the present embodiments.

Figure 4:
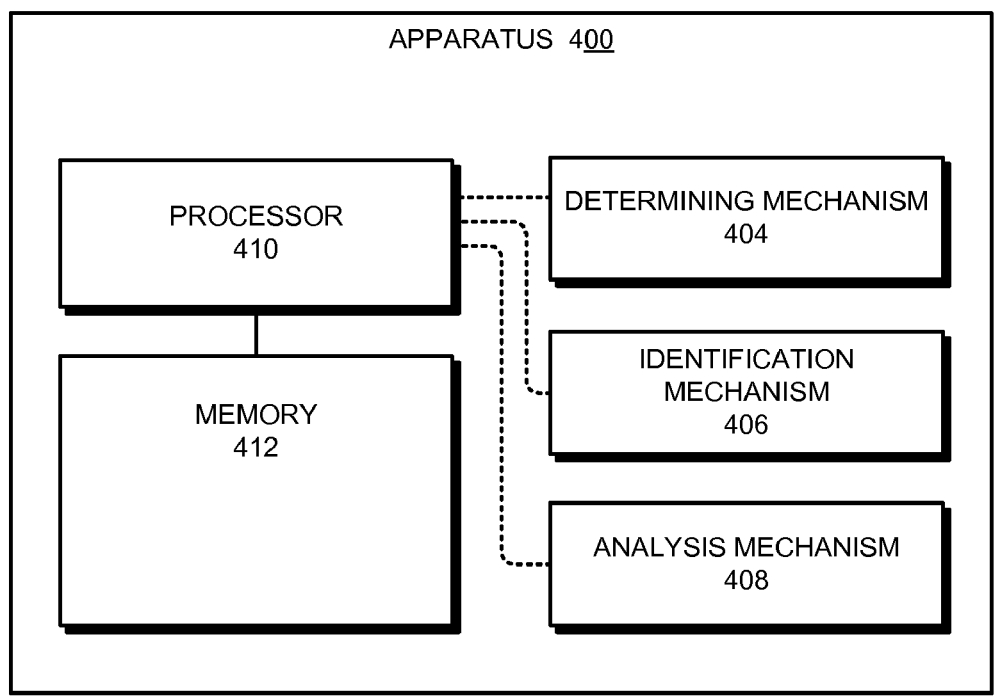
FIG. 4 illustrates an apparatus that detects incorrectly translated text in a document in accordance with an embodiment.

FIG. 4 illustrates an apparatus 400 that detects incorrectly translated text in a document in accordance with an embodiment. Apparatus 400 includes presenting mechanism 404, identification mechanism 406, analysis mechanism 408, processor 410, and memory 412. During operation, determining mechanism 404 then determines a language associated with the majority of the text in the document. Next, identification mechanism 406 determines the set of terms in the document that are invalid terms in the identified language. Finally, analysis mechanism 408 analyzes this set of invalid terms to detect any correlations that might indicate that one or more of the invalid terms comprise incorrectly translated text.

In summary, translating the text associated within a software application into multiple languages can be a challenging task, and a range of potential errors may result in incorrectly translated text appearing in the released application. Some of the embodiments described above provide a process for programmatically finding text in a document that is in a different language than the surrounding text. Some embodiments: detect the primary language for a document; use language identification techniques and/or a spell-checker for that language to find invalid words in the document; perform distribution analysis upon the set of invalid words to find correlated blocks of invalid terms; and flag such correlated blocks as incorrectly translated strings. These techniques enable test engineers to automatically identify potential errors introduced in a translation process, thereby eliminating the need for test engineers to manually and exhaustively examine the documents. Note that the described techniques can be used by international test engineers, developers, localization coordinators, and other people to facilitate creating, translating, and verifying text for an application that supports multiple languages. Note also that the described techniques are not limited to translation processes, but may also be applied to detecting other blocks of anomalous text in documents.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the present embodiments. The scope of the embodiments is defined by the appended claims.

What is claimed is:

1. A method for detecting incorrectly translated text in a translated document, comprising:
   identifying a target language for the translated document;
   identifying a set of one or more terms in the translated document that are invalid terms in the target language;
   analyzing, as performed by a processor, the set of invalid terms to determine a distribution of invalid terms in the translated document; and
   determining from the distribution of invalid terms whether one or more of the invalid terms comprise incorrectly translated text.

2. The method of claim 1, wherein identifying the set of invalid terms involves one or more of the following:
   spell checking the target language to identify the set of invalid terms, or
   using a language identification technique that identifies the set of invalid terms.

3. The method of claim 1, wherein identifying the target language for the translated document comprises:
   receiving input from a user specifying the target language, or
   using a language-identification technique to identify the target language.

4. The method of claim 1, further comprising:
   receiving a list of one or more exception terms to exclude from the set of invalid terms;
   identifying a particular one of the exception terms in the set of invalid terms; and
   ignoring the identified particular exception term found in the list of invalid terms when analyzing the set of invalid terms.

5. The method of claim 1, wherein determining the distribution of invalid terms further comprises detecting contiguous invalid terms in the translated document.

6. The method of claim 5, further comprising identifying three or more contiguous invalid terms as a block of incorrectly translated text.

7. The method of claim 6, further comprising:
   outputting the block of incorrectly translated text for confirmation by a user.

8. The method of claim 7, further comprising:
determining that the output block of incorrectly translated text was erroneously not translated during an automated translation process based on the confirmation.

9. The method of claim 8, further comprising:
determining a base language from which the translated document was translated; and
spell checking the base language to confirm that the block of incorrectly translated text is in the base language.

10. The method of claim 8, wherein receiving the translated document comprises:
using a web-crawler to determine one or more documents associated with an application; and
determining incorrectly translated text for the one or more documents associated with the application.

11. A non-transitory computer-readable storage medium storing instructions that when executed by a computer cause the computer to perform a method for detecting incorrectly translated text in a translated document, the method comprising:
identifying a target language for the translated document;
identifying a set of one or more terms in the translated document that are invalid terms in the target language;
analyzing, as performed by the computer, the set of invalid terms to determine a distribution of invalid terms in the translated document; and
determining from the distribution of invalid terms whether one or more of the invalid terms comprise incorrectly translated text.

12. The non-transitory computer-readable storage medium of claim 11, wherein identifying the set of invalid terms involves one or more of the following:
using a spell-checker for the target language to identify the set of invalid terms, or
using a language identification technique that identifies the set of invalid terms.

13. The non-transitory computer-readable storage medium of claim 11, wherein identifying the target language for the translated document comprises:
receiving input from a user specifying the target language, or
using a language-identification technique to identify the target language.

14. The non-transitory computer-readable storage medium of claim 11, wherein the method further comprises:
receiving a list of one or more exception terms to exclude from the set of invalid terms;
identifying a particular one of the exception terms in the set of invalid terms; and
ignoring the identified particular exception term found in the list of invalid terms when analyzing the set of invalid terms.

15. The non-transitory computer-readable storage medium of claim 11, wherein determining the distribution of invalid terms further comprises detecting contiguous invalid terms in the translated document.

16. The non-transitory computer-readable storage medium of claim 15, the method further comprising identifying three or more contiguous invalid terms as a block of incorrectly translated text.

17. The non-transitory computer-readable storage medium of claim 16, the method further comprising outputting the block of incorrectly translated text for confirmation by a user.

18. The non-transitory computer-readable storage medium of claim 17, the method further comprising determining that the output block of incorrectly translated text was erroneously not translated during an automated translation process based on the confirmation.

19. The non-transitory computer-readable storage, medium of claim 18, wherein the method further comprises:
determining a base language from which the translated document was translated; and
using a spell-checker for the base language to confirm that the block of incorrectly translated text is in the base language.

20. A computing apparatus that detects incorrectly translated text in a translated document, comprising:
a processor and a memory;
a determining mechanism configured to identify a target language for the translated document;
an identification mechanism configured to identify a set of one or more terms in the translated document that are invalid terms in the target language; and
an analysis mechanism configured to analyze the set of invalid terms to determine a distribution of invalid terms in the translated document;
wherein the determining mechanism is further configured to determine from the distribution of invalid terms whether one or more of the invalid terms comprise incorrectly translated text.

* * * * *